United States Patent [19]

Bammert et al.

[11] Patent Number: 4,630,906
[45] Date of Patent: Dec. 23, 1986

[54] BLANK FOR EYEGLASS LENSES HAVING ELLIPSE-LIKE EDGE CURVES AND MEANS AND METHOD FOR SELECTING

[75] Inventors: Hubert Bammert, Aalen; Hans Lahres, AA-Wasseralfingen; Egon Mosch, Essingen, all of Fed. Rep. of Germany

[73] Assignee: Carl-Zeiss-Stiftung, Heidenheim on the Brenz, Fed. Rep. of Germany

[21] Appl. No.: 493,729

[22] Filed: May 11, 1983

[30] Foreign Application Priority Data

May 14, 1982 [DE] Fed. Rep. of Germany ..... 32181396

[51] Int. Cl.$^4$ .............................................. G02C 7/02
[52] U.S. Cl. ..................... 351/159; 33/507; 351/174; 351/176; 351/177
[58] Field of Search ............... 351/159, 169, 174, 176, 351/177, 178; 33/507

[56] References Cited

U.S. PATENT DOCUMENTS

| | | | |
|---|---|---|---|
| 1,520,445 | 12/1924 | Rushmer | 351/159 |
| 2,878,721 | 3/1959 | Kanolt | 351/169 |
| 3,645,610 | 2/1972 | Duckwall et al. | 351/159 |
| 3,950,082 | 4/1976 | Volk | 351/169 |
| 4,181,409 | 1/1980 | Whitney | 351/167 |

FOREIGN PATENT DOCUMENTS

| | | | |
|---|---|---|---|
| 1136522 | 5/1957 | France | 351/159 |
| 2375617 | 7/1978 | France | . |
| 41474 | 3/1980 | Japan | 351/174 |

Primary Examiner—John K. Corbin
Assistant Examiner—Scott J. Sugarman
Attorney, Agent, or Firm—Stonebraker, Shepard & Stephens

[57] ABSTRACT

In eyeglass lenses which have a center thickness greater than the edge thickness in at least one cross section and different dioptric powers in different sections, round-blanks lead to ground eyeglass lenses which are of relatively high weight. The weight of such an eyeglass lens, and thus its center and edge thickness, is reduced if the blank is imparted a substantially elliptical edge curve. In order to reduce cost and expense, the dioptric range of the series of eyeglass lenses is divided into a predetermined number of ranges and a given type of edge curve is associated with each range. Within each range there are a number of centrally similar edge curves of different height and width for such type of edge curve. All edge curves are so selected that the eyeglass lens blanks provided with them have an edge thickness over the elliptical portion of their periphery which varies by less than 1.5 mm. An easily operated device is provided in order to select the optimal blank for mounting in an eyeglass frame.

10 Claims, 6 Drawing Figures

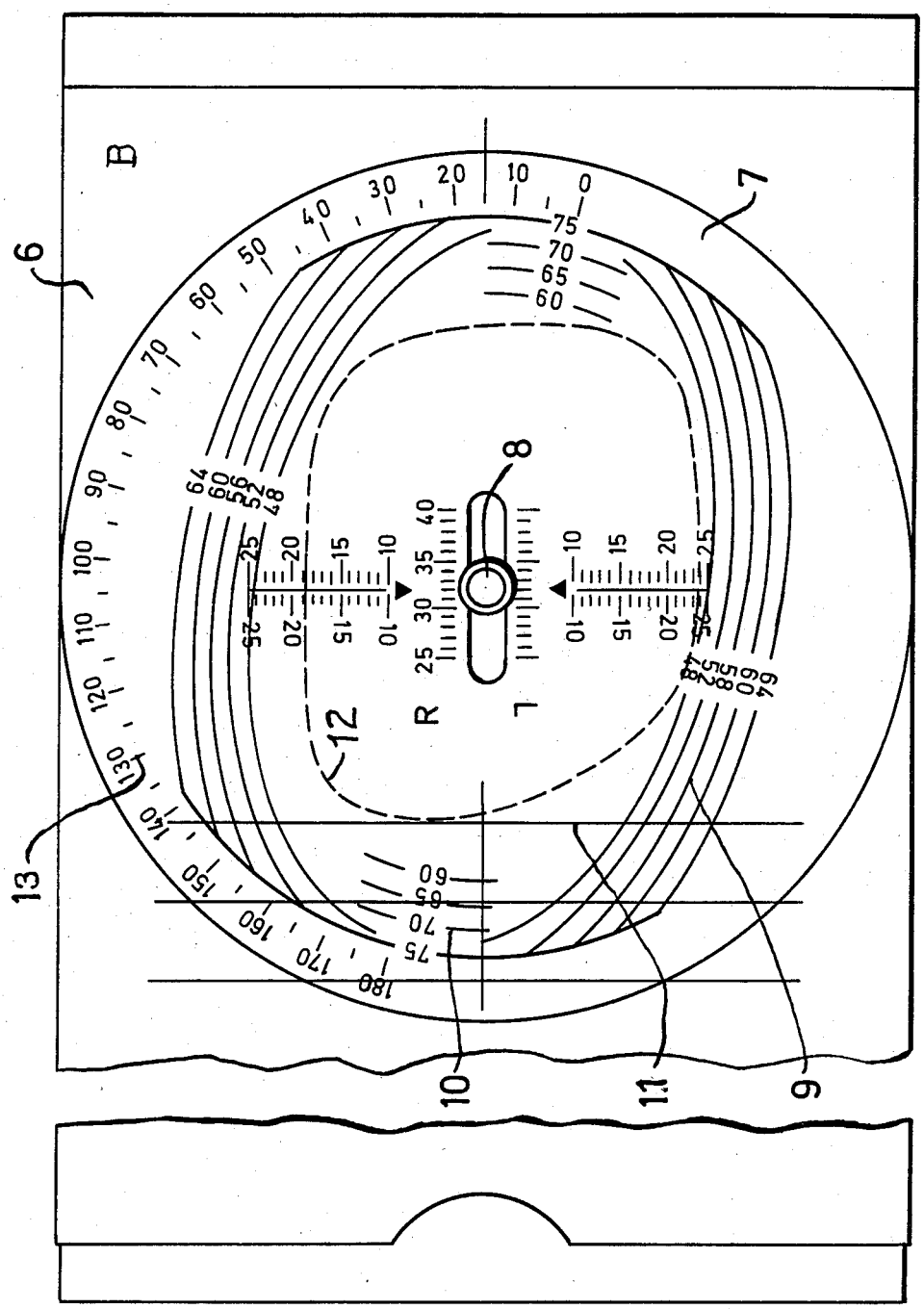

BLANK FOR EYEGLASS LENSES HAVING ELLIPSE-LIKE EDGE CURVES AND MEANS AND METHOD FOR SELECTING

SUMMARY OF THE INVENTION

The present invention refers to a blank for eyeglass lenses which have a center thickness which is greater than their edge thickness in at least one cross section and which have different dioptric powers in different cross sections.

Eyeglass lenses are customarily manufactured in such a way that after grinding and polishing its two refracting surfaces to their final shape the lens has a circular edge curve. Such lenses are referred to as round blanks. When mounting an eyeglass into an eyeglass-frame the edge curve of the round eyeglass lens blank must be given a form which corresponds to the edge curve of the associated frame opening.

Eyeglass lens blanks of negative dioptric power customarily have a center thickness of about 1.5 mm, while their edge thickness depends on their dioptric power.

Eyeglass lens blanks of positive dioptric power are customarily made with an edge thickness of about 0.5 mm, while their center thickness depends on their dioptric power.

Astigmatic eyeglass lenses have at least one surface which is of minimum curvature in one principal cross section and of maximum curvature in the other principal cross section. In the case of round eye-glass lens blanks this has the result that the edge thickness in the region of one principal cross section can be selected, for instance, as 0.5 mm, but that the edge thickness is very much larger in the region of the other principal cross section. Depending on the amount of the difference in the dioptric powers in the two principal sections, variations in the edge thickness by several millimeters along the periphery are possible in the case of round eyeglass lens blanks.

Eyeglass frames generally have lens receiving openings or cutouts of such shape that the eyeglass lenses which are to be inserted are wider than they are high. Upon the grinding of the round eyeglass lens blanks into the final form to fit the frame therefore the most material is removed from the top and the bottom portions of the round blanks (90° and 270° in the Tabo Axis Chart).

If an astigmatic round eyeglass lens blank whose thinnest edge thickness is on top and on bottom (90° and 270° in the Tabo Axis Chart) and whose edge thickness is greatest at the temple (0° and 180°) is ground to fit into an eyeglass frame, then, if the center thickness in the vertical section is greater than the edge thickness there is obtained a shape of eyeglass lens whose edge thickness is great over the entire periphery. Such an eyeglass lens is of relatively high weight and is not aesthetically pleasing.

As a solution, up to now, for the urgently desired reduction of weight in the case of shaped lenses of the type described, the manufacturer or the prescription shop has reduced the center thickness of the finished-edge lens to such an extent that the edge thickness, at least at one point, reaches a minimum value of, for instance, 0.5 mm. In this way one lens surface has, therefore, to be produced completely new.

It is clear that this method is extremely expensive since practically every eyeglass lens which is reduced in weight in this way must be ground individually.

These remarks apply by analogy to all eyeglass lenses which have, in at least one section, a center thickness which is greater than their edge thickness and have optical powers which differ in different cross sections. This covers, in addition to the astigmatic eyeglass lenses already mentioned, also lenses which have aspherical or atoric surfaces or continous-focus surfaces.

The object of the present invention is to create for eyeglass lenses of the above-indicated type a blank of such a nature that in its final form for insertion into the eyeglass frame it has the lowest possible weight without requiring additional individual lens surface grinding and polishing and without its manufacture resulting in a high expense.

This object is achieved in accordance with the invention by defining a fixed number of ranges within the entire dioptric field to be covered, and providing a series of lens blanks appropriate to each of these ranges, the blanks being so formed that they have appropriate ellipse-like edge curves on parts of their peripheries and have edge thickness varying by less than 1.5 mm over the elliptical peripheral part.

The types of ellipse-like edge curves of the blanks are obtained by calculation of eyeglass lenses of constant edge thickness. There are such eyeglass lenses in each of the ranges selected, while the other centrally similar edge curves used in the range in question lead to blanks whose edge thickness varies within the limits indicated and therefore only very slightly.

Blanks shaped in accordance with these features represent an optimum compromise between the desire for the lowest possible weight of the finished shaped eyeglass lens and the lowest possible cost of manufacture.

On the basis of tables and reference data for an eyeglass lens having the prescribed optical values and of the eyeglass frame selected by the customer, the optician can determine the type of edge curve and the curve height and width in such a manner that the eyeglass lens which is finally inserted in the frame has the smallest possible center thickness and thus the lowest possible weight.

On the basis of the values indicated by the optician, the manufacturer can supply the requested eyeglass lens blank from stock or manufacture it. In this way, stock-keeping is facilitated and manufacture simplified by the limitation to a fixed number of edge curves. It is possible to manufacture all edge-curve types entering into consideration as well as all centrally similar edge curves with the use of a single machine.

It is advisable to develop the edge curve as an ellipse whose eccentricity is between the values of 0.95 and 0.40.

Round eyeglass lens blanks are supplied by the manufacturer in certain graded ranges of diameters. One such range is formed, for instance, by round eyeglass lens blanks of diameters of 52, 56, 60, 65, 70 and 75 mm. Now it is possible that the elliptical edge curves for the blank lenses will in certain portions extend beyond these customary diameters of round eyeglass lens blanks. In such cases the edge curve is developed as a circular arc of the round form rather than the elliptical edge in those portions of the edge in which the elliptical curve would exceed customary diameters of the round form.

Other suitable embodiments of the blank in accordance with the invention are described below. There is also described a means for selecting the blank which is best adapted to the specific problem.

BRIEF DESCRIPTION OF THE DRAWINGS

The invention will be explained in further detail with reference to the accompanying drawings, in which:

FIG. 4 is an illustrative embodiment of a device for selecting the suitable blank for an astigmatic eyeglass lens.

DETAILED DESCRIPTION

Figure 1:
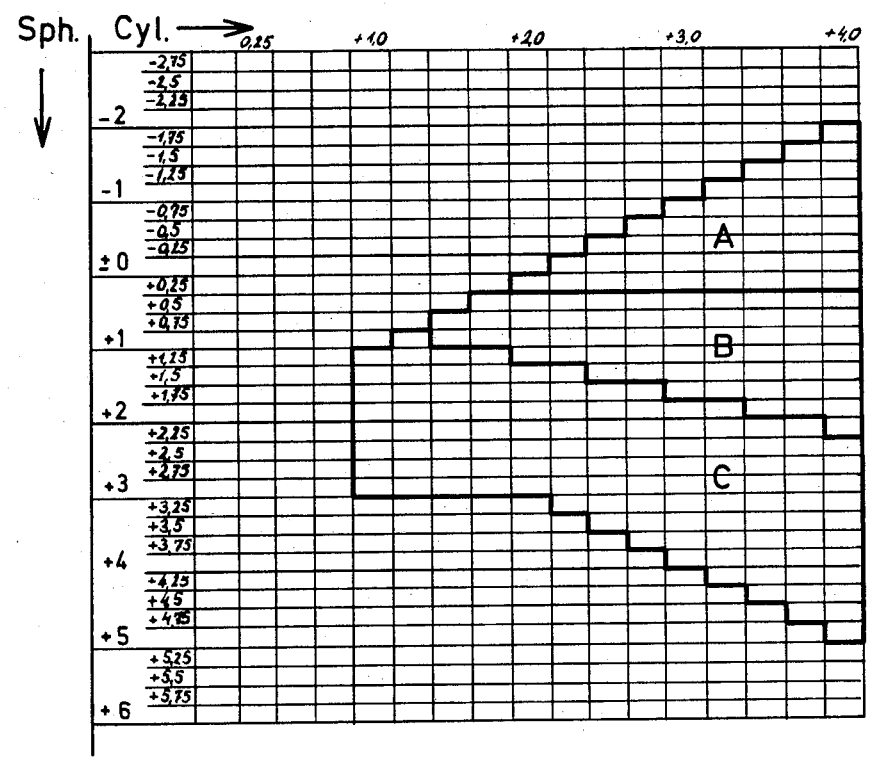
FIG. 1 is a coordinate graph of the dioptric data of a series of astigmatic eyeglass lenses, and it also shows an illustrative division into different ranges.

In FIG. 1, the dioptric powers of a series of astigmatic eyeglass lenses are shown. This graph covers the values from −3 to +6 spherical and 0 to +4 cylindrical. In this diagram, A, B, and C are three ranges or regions in which the blank of the eyeglass lens is developed differently from the round blank shape so as to result in an optimal saving in weight.

Figure 2A:
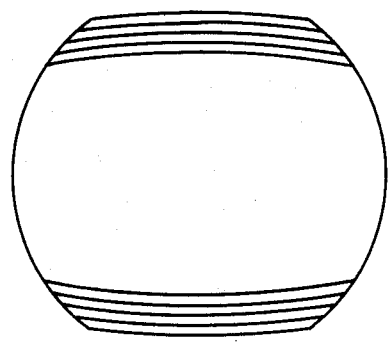
FIGS. 2a, 2b, and 2c show the edge curves for eyeglass lens blanks associated with regions A, B, and C of FIG. 1.

With each of the ranges A, B, and C of FIG. 1 there is associated a very specific type of edge curve which has an elliptical shape over at least partial regions of its periphery. In each range there are provided a plurality of edge curves of different height and width which are centrally similar to the corresponding type of edge curve. This can be noted from FIGS. 2a, 2b, and 2c which show the edge curves associated with the regions A, B and C of FIG. 1. These curves are developed as ellipses whose eccentricity lies between the values of 0.95 and 0.4 and preferably between 0.9 and 0.5.

Figure 2B:
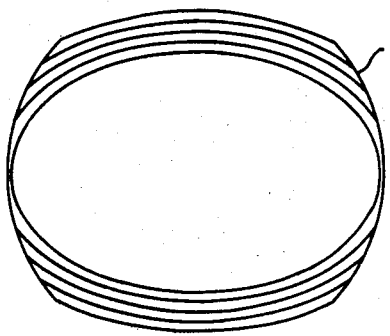
Figure 2C:
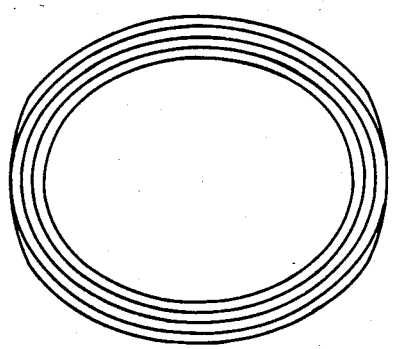
Figure 3:
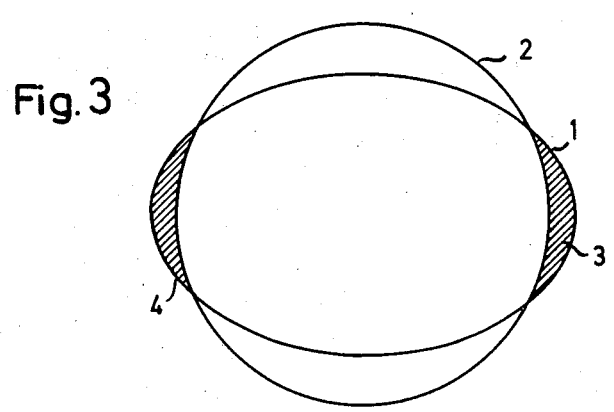
FIG. 3 shows an example which serves to explain the shaping of an edge curve.

FIG. 3 shows an edge curve of the type shown in FIG. 2b which is here designated as an ellipse 1. The curve 2 is a maximum diameter, taken as example, of a round eyeglass lens blank. Since the blanks shaped in accordance with the invention are naturally not larger than the maximum diameter of a round eyeglass lens blank, the shaded regions 3 and 4 are absent, i.e. in final effect the edge curve is developed as a circular arc in those portions in which the elliptical edge curve 1 extends beyond the customary maximum diameter 2 of a round eyeglass lens blank. The edge curve thus produced is designated 5 in FIG. 2b.

The types of edge curves for the individual ranges are so calculated that the eyeglass lenses which lie within the corresponding range and receive the corresponding blank shape have an edge thickness over the elliptical peripheral portion which varies by less than 1.5 mm. Variation of the edge thickness by an amount less than 1 mm is desirable.

In the following table the edge curves resulting for a given selected eyeglass frame are stated for three astigmatic eyeglass lenses, taken as example, by indication of the major and minor diameters of the ellipse. In this connection it is assumed that the axis of the principal section is horizontal. It can be seen from this table that by the selection of the blank in accordance with the invention a considerable saving in center thickness and weight is obtained as compared with the round shape of blank. The saving in weight in Example 1 is almost 50%, while in Examples 2 and 3 it is 30%.

| No. | Spher. diopt. | Cyl. diopt. | Ellipse diam. Major (mm) | Ellipse diam. Minor (mm) | Center thickness (mm) | Weight (g) | Round blank Center thickness (mm) | Round blank Weight (g) |
|---|---|---|---|---|---|---|---|---|
| 1 | +2.25 | 4.0 | 66 | 52 | 4.7 | 21.5 | 7.4 | 47.6 |
| 2 | +0.75 | 2.0 | 66 | 56 | 2.9 | 16.9 | 3.8 | 24.1 |
| 3 | +0.50 | 4.0 | 66 | 56 | 4.1 | 24.2 | 5.5 | 35.3 |

In the case of Example 1 of the Table, the edge thickness of the eyeglass blank is constant over the elliptical portion of its periphery; in Example 2 it varies by 0.2 mm and in Example 3 by 0.7 mm.

The manner of selecting the optical blank will now be explained with reference to FIG. 4.

The device for selecting this blank consists of a base 6 on which is mounted a disk 7 rotatable around the point 8. This disk is of transparent material (e.g., a disk of stiff plastic) and bears on its upper circumferential region a Tabo Axis Diagram 13 graduated from 0° to 180°. There are also provided on this disk elliptical curves 9 which correspond to the edge curves shown in FIG. 2b. In addition, the diameters of round eyeglass lens blanks are indicated within a small region as shown at 10.

A horizontal line and three vertical lines are present on the base 6. The vertical lines serve for the positioning of the eyeglass frame, the vertical line 11 serving for instance as a reference mark for the cutout for the right eyeglass lens. By shifting the central post of the disk 7 along a slot in the base 6, the interpupillary distance can be set according to a scale marked on the base. It has a value of 64 mm in the example shown.

If the eyeglass lens prescribed has values of spherical +1.5, cylindrical +4.0 then, on the basis of the table given in FIG. 1, it is contained within range B. In order to select the correct eyeglass blank the optician now makes use of the device which is designated B in FIG. 4. First of all, by rotating disk 7 he sets the axial position of the astigmatism at the value indicated, which lies at 15° in the example shown. Thereupon, the measured value of the interpupillary distance is set by shifting the base 6 with respect to the disk 7.

After this preliminary work, the eyeglass frame selected by the customer is placed on the disk 7 in such a manner that the edge of the right eyeglass lens cutout 12 is placed at the graduation 11 and the cutout assumes the position shown in dashed line in FIG. 4.

The optician can now readily read, from the scales marked on the disk, that the optimum blank is an ellipse of type B with an ellipse width of 60 mm (scale 10) and an ellipse height of 48 mm (scale of 9).

These data together with the dioptric data of the eyeglass lens are forwarded by the optician to the manufacturer and the optician receives from the latter an eyeglass blank of a shape according to his selection, whose edge thickness does not vary by more than 1.5 mm over its entire elliptical course. In this way there is obtained an optimalizing of the center thickness and of the weight of the eyeglass lens when it mounted into the eyeglass frame, i.e. the user of the glasses enjoys maximum comfort when wearing the glasses.

The selection of the optimum shape of blank for the eyeglass lens has been explained, with reference to the drawings, based on an astigmatic eyeglass lens as an example. The selection of the optimal blank is effected in the same manner also for eyeglass lenses which have an aspherical or atoric surface or else for eyeglass lenses having a dioptric power progressively varying between different zones of vision. It has been found in this connection that, for instance, in the case of such progressively variable focal power lenses the same edge-curve shapes can be used as used for astigmatic eyeglass lenses.

What is claimed is:

1. A series of eyeglass blanks forming a collection from which one may select a blank suitable for making by normal finishing methods and without grinding a new surface on the blank, a finished eyeglass lens in accordance with a prescription which calls for a lens which
    (a) has a center thickness greater than its edge thickness in at least one cross section, and
    (b) has different optical powers in different cross sections, and
    (c) has dioptric powers within a substantial range of powers for which the series is designed,
each blank in said series having an ellipse-like edge curve on at least partial regions of its periphery, said ellipse-like edge curve being so placed with respect to dioptric curvatures of said blank that the edge thickness of the finished eyeglass lens made from the blank varies by less than 1.5 mm throughout said ellispe-like edge curve, and the weight of the finished lens is substantially less than the weight of a lens of the same dioptric power made from a conventional circular blank.

2. The invention defined in claim 1, further characterized by the fact that the edge curves are ellipses the eccentricity of which lies between the values of 0.95 and 0.40.

3. The invention defined in claim 1, further characterized by the fact that the edge curve is developed as a circular arc in those portions in which the ellipse edge curves extend beyond the customary diameter of round-blank eyeglass lenses.

4. The invention defined in claim 1, further characterized by the fact that within each range there are provided a plurality of edge curves of different height and width which are centrally similar to a corresponding type of edge curve.

5. The invention defined in claim 1, characterized by the fact that the edge thickness of all eyeglass lenses lying within the same range varies by less than 1 mm throughout the elliptical peripheral portion of each lens.

6. The invention defined in claim 1, further including a plurality of series of blanks for a plurality of different ranges of dioptric powers.

7. The invention defined in claim 6, wherein one range (A) of dioptric powers includes powers from +0.25 diopters spherical to −1.75 diopters spherical combined with cylindrical powers varying from +2.0 at +0.25 sph. to +4.0 cyl. at −1.75 sph., and another range (B) includes powers from +0.5 sph. to +2.25 sph. combined with cylindrical powers varying from +1.5 cyl. at lower spherical values to +4.0 cyl. at higher spherical values, and a third range (C) includes spherical powers from +1.0 to +5.0 combined with cylindrical powers varying from +1.0 at lower spherical values to +4.0 cyl. at higher spherical values.

8. The method of selecting a most suitable rough blank from a series of different rough blanks having a different shapes and dimensions, for use in mounting on eyeglass lens of a certain prescription into a eyeglass frame, the method including the steps of:
    (a) providing a table of various dioptric combinations likely to be encountered in prescriptions;
    (b) indicating on such table a limited number of ranges of dioptric combinations;
    (c) providing a plurality of selecting devices, one for each of said ranges;
    (d) each selecting device including
        (i) a base,
        (ii) a disk rotatable on said base,
        (iii) scale markings on said disk to indicate degrees of rotation of a cylindrical dioptric axis,
        (iv) said disk being movable relative to said base to make an interpupillary setting,
        (v) markings on said disk to indicate outlines of lens shapes and sizes appropriate to the particular range for which the selecting device is to be used, and
        (vi) markings on said base for positioning thereon an eyeglass frame;
    (e) positioning an eyeglass frame on the base of the selecting device appropriate for the range of said table which relates to the particular lens to be mounted,
    (f) setting the disk of the selecting device to a desired interpupillary distance and a degree of rotation required by said prescription, and
    (g) determining from the size and shape markings on the disk, with relation to said eyeglass frame, the proper size and shape of the rough blank to be used.

9. The method of preparing an eyeglass lens blank of the kind having a center thickness which is greater than its edge thickness in at least one cross section and having different dioptric powers in different cross sections, to furnish a desired one of a series of such blanks of different powers each of which blanks is ready for trimming by an optician to fit into a selected eyeglass frame to provide a trimmed lens of reduced thickness and weight as compared with a lens trimmed from a customary round blank of the same powers, without requiring any surface grinding of the blank or lens by the optician, which method comprises the steps of:
    (a) selecting a specific elliptical edge curve shape for a proposed blank having a specific spherical power and a specific astigmatic cylindrical power, said elliptical curve having a major elliptical axis extending in the same direction as the axis of said cylindrical power and a minor elliptical axis perpendicular to said major axis, said selected elliptical edge curve being selected to have at least a major part of its periphery lying within a circle defining a desired nominal diameter of the proposed blank notwithstanding that ends of the selected elliptical curve may lie outside of said circle, the selected elliptical edge curve having an elliptical eccentricity in the range from 0.9 to 0.5;
    (b) selecting a proposed center thickness for said proposed blank such that a blank made of said elliptical shape and with said selected center thickness will have a minimum edge thickness at points where said minor axis intersects said edge curve and will have a variation of thickness of less than 1.5 mm over the entire elliptical part of the periphery within said circle; and (c) producing a blank having the selected characteristics as defined in foregoing clauses (a) and (b);

(d) so that an optician to whom the produced blank is furnished may trim the edges of the produced blank to a shape to fit into an eyeglass frame, thereby providing an eyeglass lens of minimum thickness and weight without having to perform grinding operations on lens surfaces of the blank furnished to the optician.

10. A device for selecting the blank for an eyeglass lens of minimum weight from a series of eyeglass lenses which in at least one cross section have a center thickness which is greater than the edge thickness and different optical powers in different cross sections, said device being characterized by the provision of a table which divides the optical range of the series into a fixed number of ranges with each of which a type of edge curve is associated and by the provision of a number, corresponding to the number of ranges, of bases (6) each of which bears a family of edge curves which are centrally similar to the associated type of edge curve on a disk (7), which is rotatable on said base to a position in accordance with the axial position of the cross section of greatest optical power of the eyeglass lens a blank for which is to be selected, said base furthermore having reference lines (11) for the positioning thereon an eyeglass frame (12), into which the eyeglass is to be mounted.

* * * * *